Figure 1:
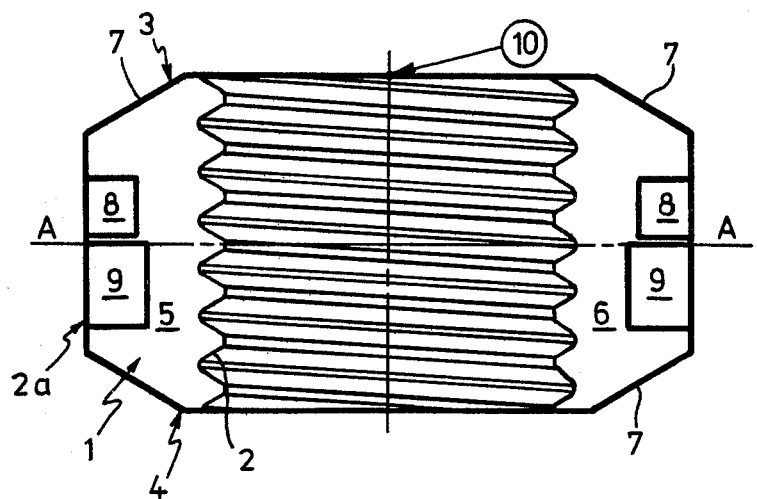

United States Patent [19]
Williams

[11] 4,083,288
[45] Apr. 11, 1978

[54] SPLIT NUTS

[76] Inventor: Patrick Yelverton Williams, 2 Morotai Crescent, Castlecrag, New South Wales, Australia, 2068

[21] Appl. No.: 732,974

[22] Filed: Oct. 18, 1976

[30] Foreign Application Priority Data

Jun. 11, 1976  Australia ............................ 6267/76
Jul. 6, 1976  Australia ............................ 6552/76

[51] Int. Cl.² ............................................ F16B 37/10
[52] U.S. Cl. ..................................................... 85/33
[58] Field of Search ................... 85/33, 15; 151/19 R

[56] References Cited

U.S. PATENT DOCUMENTS

| | | | |
|---|---|---|---|
| 2,377,581 | 6/1945 | Shaffrey | 85/33 |
| 2,676,509 | 4/1954 | Graham | 85/33 |
| 2,882,781 | 4/1959 | Gates | 85/33 |
| 3,675,530 | 7/1972 | Victor | 85/33 |
| 3,734,547 | 5/1973 | Kojima | 85/33 |
| 3,797,336 | 3/1974 | Howe | 85/33 |
| 3,799,026 | 3/1974 | Selch | 85/33 |

FOREIGN PATENT DOCUMENTS

| | | | |
|---|---|---|---|
| 561,892 | 8/1923 | France | 85/33 |
| 1,206,230 | 8/1959 | France | 85/33 |
| 1,119,061 | 12/1961 | Germany | 85/33 |
| 1,144,542 | 2/1963 | Germany | 85/33 |

*Primary Examiner*—Marion Parsons, Jr.
*Attorney, Agent, or Firm*—Eugene E. Geoffrey, Jr.

[57] ABSTRACT

A split nut is formed from two substantially identical screw-threaded half nuts, each of which has chamfered ends, preferably at about 60° to the axis of the nut, to engage in a conical counterbore of a washer or workpiece. When the split nut is tightened it remains securely in place. Each half nut has side faces extending in radial planes with complementary locating means symmetrically disposed on either side of the central plane of the half nut taken at right angles to the axis, and the screw-thread has a start at one end only, whereby one of the half nuts is inverted so that the respective complementary locating means interengage to align axially the half nuts.

8 Claims, 4 Drawing Figures

SPLIT NUTS

The present invention relates to split nuts which comprise a plurality of segments which cooperate together and replace a conventional one-piece nut for use on a stud or bolt.

Although in smaller sizes, split nuts will be more expensive to manufacture, they may be more economic if account is taken of the cost of fitting the nut onto a stud or bolt. More particularly split nuts offer a great potential advantage in connection with the removal of the nut from the bolt. This is particularly the case where the bolt is exposed to the risk of damage, corrosion or coating with foreign material which could cause a conventional one-piece nut to jam on the thread. However, hitherto split nuts have been of a complex design and therefore expensive to produce and often expensive to fit. Frequently, the split nut relies on captive devices to hold the nut segments together and generally the nut segments differ from one another, for example by having left and right engagement features.

In U.S. Pat. No. 3,797,336 segmented nut arrangements are described. One embodiment comprises a nut formed in two halves with a circumferential spring clip located in a groove to hold the nut halves together and to urge them into clamping engagement around a bolt or stud. However, the arrangements described rely on the use of special tools which would prevent the split nut arrangement being used where restricted access occurred. The object of the special tools is to spread the segments of the nut so as to disengage the segments from the screw thread so as to permit the nut to be rapidly positioned at the location at which it can be tightened. A different tool is required when the split nut is to be removed after loosening. This patent specification does, however, describe the use of a chamfered end face at one end of the split nut to engage a corresponding shaped washer so that as the nut is tightened a wedging effect clamps the nut segments firmly around the bolt.

There is, nevertheless, still an unfulfilled demand for a split nut arrangement which can be applied easily in most situations, and yet is still a strong nut. Furthermore, consistently correct application is vital, even if the fitter is giving the operation less than his full attention.

According to one aspect of the present invention, there is provided an element which forms half of a split nut assembly, the other half of the split nut assembly being a substantially identical element which is inverted relative to the first element. The element is thus arcuate in shape and extends around an axis which coincides with the axis of the bolt on which the split nut is to be fitted. The element has an inner screw threaded surface, an outer peripheral surface to be engaged in order to rotate the element and respective end faces which are chamfered so that in use the chamfered surfaces of two elements forming the split nut engage a corresponding surface of a washer or a workpiece so that as the split nut is tightened, the elements are urged into clamping engagement around the bolt. The element also has first and second side faces extending between the inner and outer surfaces with at least one of the side faces having location means associated therewith and formed so that in use the location means interengage with the location means of the other element of the split nut. This causes the elements to be positioned relative to one another in the axial direction, and incorrect assembly is prevented.

To assemble the nut, one of the elements is inverted relative to the other element, and the screw threading on the inner surface of the elements is such that when two elements are assembled to form the split nut, a screw thread is provided leading from one end of the nut to the other.

Advantageous further features which may be used in association with the invention will now be described.

Preferably both of the side faces of the element have first and second corresponding location members, for example the first location member in each case comprising a projection and the second location member comprising a recess.

It is preferable that the pair of location members of each of the side faces is the same as the other pair and that in each case the first and second location members are symmetricaly disposed on either side of a central plane which extends through the elements and at right angles to the axis of the element.

So that identical split nut elements can be used, the screw threading is such that when the nut is viewed as a true half nut a line on the plane of the split at the midheight of the nut element passes substantially through the centre of a crest of the thread at one side of the element and on the other side of the element passes substantially through the center of the root of a thread.

The side faces are set back from the axial plane of the split nut in order to provide a clearance which permits the elements to be clamped tightly around the bolt. The chamfer on each end face can be flat so as to lie on a cone. Alternatively, a domed or spherical face could be provided and although theoretically this may be preferable from a strength point of view because of the true rocking motion permitted, it may be more convenient in practice simply to adopt a chamfer of conical shape.

If the cone in each case is considered to have an axis coinciding with the axis of the element, then the angle of the conical face to the axis is preferably in the range 30° to 75°, and an angle of about 60° is particularly preferred since this permits the split nut to be tightened with a relatively small amount of rotation and a very strong structure can be provided with a split nut of standard height and without making the counterbore in the washer or workpiece excessively deep.

The invention extends to the combination of two elements to form a split nut. This combination may also include a relatively thick washer having a countersink corresponding in shape to the chamfer, the washer being thick enough to resist the bursting pressures applied when the nut is tightened.

Use of at least preferred embodiments of the invention permit substantial advantages to be obtained over the prior art known to the applicant. The element is of simple design and each of the two elements forming the split nut can be identical. Strong and readily installed split nuts can be provided readily by known manufacturing techniques at a relatively low price and manufacture to within very close tolerances is possible.

Not only can the split nut be lighter than a conventional nut, but the split nut embodying the invention may be applied rapidly and, for example, the split nut can be tightened with about a quarter of a turn in the case of a fairly coarse threaded nut. Furthermore, the design can ensure that correct assembly occurs and the axial alignment of the two elements in the split nut obviates the risk of one of the elements being a portion of a thread displaced in the axial direction. If such an occurrence were permitted to happen, although the nut may appear to be tightened it would be much less strong than it should be since one of the elements would not be correctly seating on the washer or workpiece.

Furthermore, complex captive devices are obviated and the enormous practical operational difficulties of having left and right elements are avoided.

Although it is preferred to provide the side faces in planes extending parallel to the axis of the element, this is not essential. For example the planes could be at a small angle such as 10° to the axis.

Should a "stiffnut" be required, i.e. a nut which tends to be more firmly retained or locked in position than a conventional nut, then a spring clip may readily be mounted around the periphery of the assembled split nut.

Figure 2:
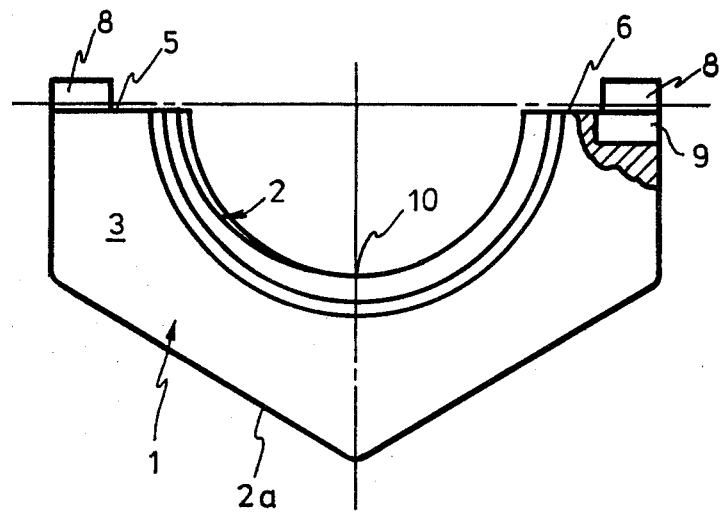
Figure 3:
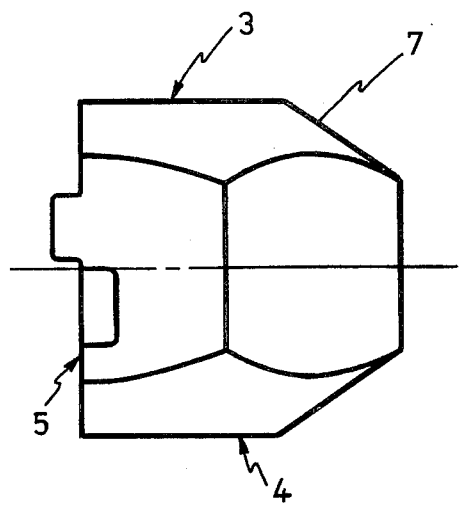
Figure 4:
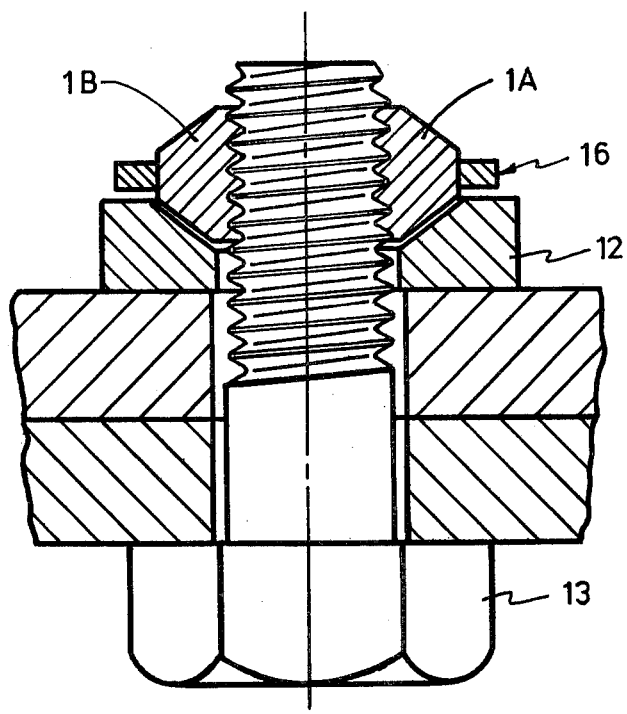

A preferred embodiment of the invention will now be described for the purpose of illustration with reference to the accompanying drawings of which:

FIG. 1 is a front elevation of a split nut element;
FIG. 2 is a plan view of the element;
FIG. 3 is a side view of the element; and
FIG. 4 is an axial cross-sectional view of an assembly comprising a split nut, a washer and a bolt.

Referring first to FIGS. 1 through 3, the element 1 comprises a threaded inner surface 2 which in this embodiment is threaded according to British Standard Whitworth, an outer peripheral surface 2a having the shape of half a hexagon, first and second end surfaces 3 and 4 and side faces 5 and 6. Each of the end faces 3 and 4 is chamfered to provide a substantially half-annular shoulder 7 which in this embodiment is conical, the angle between the axis and the cone being 60°. Each of the side faces 5 and 6 has first and second locating members, which in this embodiment are provided respectively by a raised rectangular block 8 and a similarly shaped recess 9 in which the block 8 would be a loose fit. The block 8 and recess 9 in each case are substantially symmetrically disposed about a central plane A-A which is normal to the axis of the element, the recess being enlarged to provide a clearance when a block of another element is inserted. The plane A-A will intersect the plane of the split at a line which if the nut element were projected to be a true half nut would, on one side of the element, pass through the center of the crest of the screwthread and on the other side pass through the center of the root of the thread, the element having a single 'start' indicated at 10.

A split nut is assembled by taking two identical elements and inverting one of the elements relative to the other so that at one end of the split nut the end face 3 of one element is adjacent the end face 4 of the other element and the side faces 5 and 6 confront one another. The raised block 8 of each element engages into the opposed recess 9 in the other element and thus the elements are axially aligned and motion in a direction normal to the axis is also limited.

In use the workpiece must have a counterbore of suitable shape or alternatively a strong thick washer with a suitable counterbore must be used. FIG. 4 illustrates the latter alternative in which a strong washer 12 is provided on a bolt 13, the washer having a conical counterbore corresponding to the chamfer 7 provided on the nut elements 1A and 1B.

An optional spring clip 16 is shown in FIG. 4, this being substantially annular with concave confronting end faces for engagement with a tool adapted to press the clip open for fitting and removal. The clip 16 can greatly increase the resistance to rotation of the nut when tightened.

The use of powder metallurgy is particularly suitable for manufacturing the nut elements since a high degree of accuracy can be obtained by the use of a known techniques. Furthermore, the present invention offers the advantage of the element being formed readily and economically in a die.

Sintered steel split nuts, it is believed, can be manufactured to comply with required standards for conventional low carbon steel nuts and sintered copper infiltrated steel split nuts, it is believed, can be made to comply with standards for high strength nuts.

Where a conically counterbored washer is used, this can readily be made by cold forming or powder metallurgy.

Regarding the economics of use, it has been reported that the cost of fitting a conventional nut is about four times the cost of the nut. It is expected that split nuts embodying the present invention in smaller sizes would be slightly more expensive than equivalent conventional nuts but actual experience has shown that fitting is about four times as fast, and thus it may be cheaper in many applications to use nuts according to the present invention. The invention can be especially useful in many instances particularly where demanding service conditions exist. Where it is expected that nuts will have to be removed in due course for maintenance purposes, the present invention offers considerable time saving potential, particularly where there is a high risk of corrosion or damage to the screw thread. Such damage could make it difficult or impossible to remove a conventional nut without burning or cutting.

In many engineering situations, accessibility is extremely difficult but nuts embodying the present invention can be applied and removed quickly because turning the nut through a small angle is all that is necessary.

Apart from the above advantages, a split nut embodying the present invention can be mechanically superior to a conventional nut in that a better load distribution is applied to the threads. It has been established that with conventional nuts, most of the load is taken on the first thread because the pitch of the bolt increases due to tension and the pitch of the nut decreases due to compression, and also the nut expands away from the bolt under the wedging action of the threads thus further effectively decreasing the pitch of the nut on the first few threads. Use of the present invention with a conical washer forces the two split nut elements firmly onto the bolt and a slight rotation of the two elements occurs so that the free end of the nut contracts more than the loaded end. According to his theory, this nut rotation causes an effective increase in the pitch of the nut so that the load is taken up more evenly. The applicant offers the above theoretical explanation as an aid to understanding the present invention only and does not wish to be bound by the accuracy or completeness of this theory.

Test have been conducted with embodiments of the invention and it has been demonstrated that a strength advantage over equivalent conventional nuts is provided. Tests were conducted on three-quarter inch nuts and experiments extended to the chamfer angle being 60°, 55°, and 50°. The nuts embodying the present invention were consistently stronger, the extra strength varying from a few per cent up to more than twenty per cent.

It is suggested that the optimum chamfer angle is about 60° (taken between the surface of the cone and its axis). Smaller cone angles would result in the nut having a greater height in order to accommodate a spanner and more rotation would be necessary to tighten and remove the nut. Furthermore a stronger washer would be required to accommodate the bursting load.

What is claimed is:

1. In a threaded split nut element adapted to co-operate with a second substantially identical element to form a split nut, the nut element has
   (a) an arcuate shape extending approximately 180° around an axis
   (b) first and second end faces at the respective axial ends,
   (c) an outer peripheral surface,
   (d) an inner screw-threaded surface for engaging a threaded bolt having its axis coincident with said axis of the nut element,
   (e) first and second side faces each extending between the inner and outer surfaces,
and the improvement comprising
   (f) location means comprising a projection and corresponding recess both carried by at least the first of said side faces and symmetrically offset on respective sides of a central plane through the nut element at right angles to the axis, the location means in use locating the nut element with a second nut element which is inverted, by interengagement with the substantially identical location means of the first side face of the second nut element whereby the nut elements are axially aligned and capable of assembly to form the split nut only when said second nut element is inverted, and substantial movement of the interengaged nut elements in the planes of the respective side faces is prevented,
   (g) the threading of said inner surface corresponding to a thread in respect of which a line extending across a true half nut at the intersection of said central plane and the plane of the split, passes through substantially the center of a root of the thread on one side and substantially through the crest of the thread on the other side of the nut element,
   (h) said first and second end faces being substantially conically chamfered at an angle in the range 30° to 75° measured between the cone and the axis of the nut element, whereby either end face can engage a corresponding abutment face of a washer or work piece when in use for urging the nut elements into clamping engagement around a threaded bolt.

2. A split nut element according to claim 1, wherein both of said side faces have respective location means in the form of corresponding projections and recesses symmetrically offset on respective sides of said central plane.

3. A split nut element according to claim 1, wherein the projection is a rectangularly shaped block located adjacent to the outer edge of the side face and the recess has a corresponding shape and location.

4. A split nut element according to claim 1, wherein said angle of chamfering is approximately 60°.

5. A split nut element according to claim 1, wherein each of said nut elements have an arcuate shape with an angular width not exceeding 180° to provide a clearance between the side faces and the adjacent side faces of the other nut element when a split nut is assembled.

6. A split nut element according to claim 5, wherein the outer surface of said nut is hexagonal with the side faces of each element being located substantially at the middle of flats of the hexagon.

7. In combination, two split nut elements each of which is according to claim 1 and a conically counterbored washer having on its surface remote from the counterbore an irregular surface to grip the surface of a workpiece against which the washer is to rest when in use.

8. The combination according to claim 7 and including a spring ring adapted to engage the periphery of said nut elements to secure said elements in engagement one with the other.

* * * * *